United States Patent
Ellison et al.

(10) Patent No.: US 8,161,285 B2
(45) Date of Patent: Apr. 17, 2012

(54) PROTOCOL-INDEPENDENT REMOTE ATTESTATION AND SEALING

(75) Inventors: Carl Melvin Ellison, Seattle, WA (US); John M. Parchem, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 12/239,710

(22) Filed: Sep. 26, 2008

(65) Prior Publication Data

US 2010/0082984 A1  Apr. 1, 2010

(51) Int. Cl.
G06F 21/02 (2006.01)
H04L 29/06 (2006.01)
H04L 9/28 (2006.01)

(52) U.S. Cl. ............. 713/176; 713/164; 726/29; 726/30
(58) Field of Classification Search ........................ None
See application file for complete search history.

(56) References Cited

U.S. PATENT DOCUMENTS

| | | | |
|---|---|---|---|
| 6,990,579 B1 * | 1/2006 | Herbert et al. | 713/164 |
| 6,996,710 B1 * | 2/2006 | Ellison et al. | 713/156 |
| 7,013,481 B1 * | 3/2006 | Ellison et al. | 726/4 |
| 7,194,634 B2 * | 3/2007 | Ellison et al. | 713/190 |
| 7,254,707 B2 * | 8/2007 | Herbert et al. | 713/164 |
| 7,330,981 B2 | 2/2008 | Willman | |
| 7,484,099 B2 * | 1/2009 | Bade et al. | 713/176 |
| 7,587,607 B2 * | 9/2009 | Brickell et al. | 713/182 |
| 7,752,465 B2 * | 7/2010 | Ebringer et al. | 713/194 |
| 7,930,563 B2 * | 4/2011 | Ebringer et al. | 713/194 |
| 2003/0163711 A1 | 8/2003 | Grawrock | |
| 2005/0033980 A1 | 2/2005 | Willman et al. | |
| 2005/0216736 A1 * | 9/2005 | Smith | 713/168 |
| 2005/0289347 A1 | 12/2005 | Ovadia | |
| 2006/0020781 A1 | 1/2006 | Scarlata et al. | |
| 2006/0026423 A1 * | 2/2006 | Bangerter et al. | 713/164 |
| 2006/0026693 A1 * | 2/2006 | Bade et al. | 726/34 |
| 2006/0075223 A1 | 4/2006 | Bade et al. | |
| 2006/0112420 A1 | 5/2006 | Challener et al. | |
| 2006/0212939 A1 | 9/2006 | England et al. | |
| 2006/0242428 A1 | 10/2006 | Tarkkala | |
| 2007/0006306 A1 | 1/2007 | Seifert et al. | |
| 2007/0079120 A1 * | 4/2007 | Bade et al. | 713/166 |
| 2007/0226505 A1 | 9/2007 | Brickell | |
| 2008/0046752 A1 * | 2/2008 | Berger et al. | 713/186 |
| 2008/0072287 A1 * | 3/2008 | Movva et al. | 726/2 |

(Continued)

OTHER PUBLICATIONS

"Trusted Platform Modules Strengthen User and Platform Authenticity Jan. 2005", Trusted Computing Group, 2005, pp. 1-8.

(Continued)

Primary Examiner — Christopher Revak (57) ABSTRACT

Messages, including messages in conformance with various protocols, can be hashed and the hash values added to an event log and provided to a Trusted Platform Module (TPM), which can extend one or more Platform Configuration Registers (PCRs) with the hash value, much as it would with the hash of a component that was installed or executed on the computing device with the TPM. Subsequently, the TPM can sign one or more of the PCRs and the signed PCRs can be transmitted, together with the event log and a copy of the messages. The recipient can verify the sender based on the signed PCRs, can confirm that the signed PCRs match the event log, and can verify the hash of the message in the event log by independently hashing it. In another embodiment, an intermediate hashing of the message can avoid transmission of potentially malicious executable instructions within a message.

16 Claims, 5 Drawing Sheets

U.S. PATENT DOCUMENTS

| | | | |
|---|---|---|---|
| 2008/0083039 A1* | 4/2008 | Choi et al. | 726/27 |
| 2008/0235804 A1* | 9/2008 | Bade et al. | 726/26 |
| 2008/0270603 A1* | 10/2008 | Berger et al. | 709/224 |
| 2008/0282348 A1* | 11/2008 | Proudler et al. | 726/22 |
| 2009/0013181 A1* | 1/2009 | Choi et al. | 713/168 |
| 2009/0169017 A1* | 7/2009 | Smith et al. | 380/278 |
| 2009/0307487 A1* | 12/2009 | Movva et al. | 713/156 |
| 2010/0077454 A1* | 3/2010 | Xiao et al. | 726/3 |
| 2011/0167503 A1* | 7/2011 | Horal et al. | 726/33 |
| 2011/0191579 A1* | 8/2011 | Xiao et al. | 713/156 |
| 2011/0202992 A1* | 8/2011 | Xiao et al. | 726/10 |

OTHER PUBLICATIONS

Berger, et al., "vTPM: Virtualizing the Trusted Platform Module", Feb. 14, 2006, IBM Research Report, pp. 17.

Garfinkel, et al., "Terra: A Virtual Machine-Based Platform for Trusted Computing", ACM SIGOPS Operating Systems Review, vol. 37, No. 5, 2003, ACM, pp. 14.

"TCG Software Stack (TSS) Specification Version 1.2 Level 1", Mar. 7, 2007, Trusted Computing Group, 2007, pp. 1-757.

\* cited by examiner

PROTOCOL-INDEPENDENT REMOTE ATTESTATION AND SEALING

BACKGROUND

The process of booting a computing device prepares the computing device to perform useful tasks under control of an operating system. The initial application of power to the electronic circuitry of a computing device generally only renders the computing device capable of performing rudimentary tasks, such as fetching instructions embedded into hardware components of the computing device. Thus, the boot process executes those instructions, and initiates processes that enable a computing device to perform more complex tasks. However, because the boot process performs operations prior to the execution of the operating system and any other software whose execution utilizes the operating system, malicious code executed during the boot process can remain undetected but can affect the ongoing execution properties of the system.

To provide protection against malicious code, the notion of a "trusted computer" was developed whereby the state of the computing device could be ascertained. To that end, a "Trusted Platform Module" (TPM) chip was added to the computing device, which could maintain values in a secure manner and, thereby, be used to ascertain if the computer had booted properly. In particular, the TPM chip comprises registers known as "Platform Configuration Registers" (PCRs) that store values that uniquely identify measurements of the system that have been taken since power was applied to the circuitry of the computing device. These measurements are indicative of the software that is executed during the boot process and of the presence and configuration of various hardware components. If the proper measurements were made in the correct order, then the PCRs of the TPM would contain values that could be used to verify that the computing device did indeed boot in a recognizable way. If the measurements are recognized to represent a computer that has booted in a trusted way, then the machine is in a trusted state when it begins executing the operating system software. In such a manner, malicious code in the boot sequence can be detected.

The measurements that are made during the boot process, and the resulting values stored in the PCRs of the TPM, can define the trust state of the machine. As such, those PCR values can be utilized as part of the "attestation" and "sealing" mechanisms that can be performed by the TPM. "Attestation" generally refers to the provision of signed versions of one or more PCR values to an external entity so as to prove that the computing device is in a trusted state. Specifically, one or more PCR values are signed by the TPM using its private key and then transmitted to an external entity. The external entity can verify that the PCR values did indeed come from the indicated computing device, based on the fact that the PCR values were signed with the TPM's private key, and can further verify, based on the values of the PCRs themselves, that the computing device was placed into a trusted state. "Sealing", on the other hand, refers to the retention of a secret, by the TPM, which should only be released by the TPM if the values of relevant PCRs are the same as they were when the secret was provided to the TPM to be "sealed."

Unfortunately, the measurements made during the boot process, and the resulting values stored in the PCRs of the TPM, can be dependent on factors that may not impact the security of the computing device. For example, the order in which some components are executed may be irrelevant and, consequently, there may not exist a precise control mechanism by which their execution order is controlled. If the order in which such components are executed changes, the values of one or more PCRs, as maintained by the TPM, may likewise change. As a result, secrets that were sealed by the TPM based on a particular set of PCR values will now no longer be unsealed, even though the state of the computing device has not materially changed. Similarly, attestation to an external entity may also fail, since the PCR values attested to by the TPM differ from those believed, by the external entity, to be indicative of a trusted state of the computing device.

As described above, the mechanisms of attestation and sealing are "fragile" because they can easily cause secrets to remain sealed, or computing devices to be found not in a trusted state, when their software load would have satisfied the given policy, if it were capable of being expressed generally enough. To provide more rigorous attestation and sealing mechanisms, the concepts of "generalized attestation" and "generalized sealing" have been developed. Unlike the sealing described above, generalized sealing does not seal a secret to a precise and immutable set of PCR values, but rather seals the secret to one or more policies that can be verified through a range of PCR values. Similarly, unlike the attestation described above, generalized attestation enables the trusted state of a computing device to be verified by reference to one or more policies that can be expressed via a range of PCR values.

In the generalized attestation and generalized sealing mechanisms, lists or sets of measurements are referenced, rather than individual PCR values. More specifically, in addition to, or as an alternative to, maintaining the PCR values in the manner described above, the TPM can also maintain one or more lists, or logs, of values uniquely identifying each component of the computing device that was utilized or executed during the boot process. Typically such uniquely identifying values will be hash values obtained by hashing some or all of the component utilized or executed.

During the generalized attestation and generalized sealing mechanisms, these logs of hashes are simplified and then referenced according to one or more policies. In particular, larger systems, such as an operating system, or a set of graphics drivers can comprise multiple components. When referencing the log of hashes of components utilized or executed during the boot process, the hash value of a component known to be part of a larger system, such as an operating system, or a set of graphics drivers, can be replaced by an identifier of the larger system, such as the name of the operating system or the set of graphics drivers. Ultimately, the log of hashes of components utilized or executed during the boot process can be pared down to a list comprising multiple entries identifying larger systems, such as an operating system or a set of graphics drivers and some, or possibly even no, unidentified or uncategorized hashes. Generalized attestation and generalized sealing can then be performed based on whether the few, or no, remaining hashes, and the listed larger systems, are trusted. Because individual components of larger systems are ultimately pared down to merely an indication of the larger system, the precise order of execution of each of those components during the boot process need not influence the determination of whether the computing device is in a trusted state.

Generalized attestation and sealing can be performed, not only within the context of a single computing device, but also through communications between multiple devices. For example, remote attestation can be utilized as part of a Network Access Protection (NAP) scheme. Specifically, one computing device, seeking to join a network protected by another computing device, can provide the log of hashes of the components that have been installed or executed on that computing device to the computing device protecting the network. To enable verification of the log, one or more PCR values can also be provided in a secure manner, such as by being signed by the TPM of the computing device seeking to join the network. The computing device protecting the network can then utilize the generalized attestation mechanisms described above to collapse the log of hashes into identifications of larger components and can perform an evaluation of the computing device seeking to join the network based on these larger components, and any other hashes remaining in the log. The computing device seeking to join the network has, thereby, remotely attested to its current state. A remote sealing can be similarly accomplished, with a second computing device evaluating the provided log and signed PCR values, not for a determination of, for example, whether to let the other computing device join a network, but rather in order to determine whether to unseal information and provide it. Some existing Rights Management Services (RMS), for example, utilize such a remote sealing operation.

Unfortunately, TPMs represent a hardware cost to the manufacturer of the computing device that the manufacturer cannot easily recoup. Consequently, manufacturers have selected very inexpensive TPMs that comprise very little computational ability, as compared to modern processors and other processing components of a computing device. Thus, while modern TPMs comprise sufficient computational capability to sign PCR values in order to provide them to other computing devices, and thereby perform remote attestation and remote sealing, they generally do not comprise sufficient computational capability to sign any other messages that may be exchanged coincident with the remote attestation or remote sealing. Because remote attestation and remote sealing can be utilized in a variety of mechanisms, and each such mechanism can comprise a relevant protocol, TPMs with substantially more computational abilities than modern TPMs would be required to accommodate signing messages and supporting such a myriad of protocols. TPMs with such computational abilities represent costs that are not likely to be voluntarily accepted by computing device manufacturers.

SUMMARY

Existing Trusted Platform Modules (TPMs) can be utilized to sign messages in connection with mechanisms utilizing remote attestation or remote sealing, thereby providing the security and trust benefits of such signed messages without any additional cost to the manufacturer of a computing device. Generalized remote attestation and generalized remote sealing can be utilized to more efficiently evaluate the state of the computing device requesting the remote attestation or the remote sealing.

In one embodiment, a message, such as a protocol-specific message that conforms to a communication or other protocol utilized between two or more computing devices, can be hashed and provided to a TPM for inclusion into one or more Platform Configuration Registers (PCRs). The TPM can extend one or more PCRs with the hash value in an analogous manner to its traditional operation where one or more PCRs are extended with hash values that represent measured components that were initialized or executed on the computing device. The hash of the message can also be included into a log of components that were initialized or executed on the computing device, thereby enabling the log to maintain parity with the relevant PCR values.

In another embodiment, prior to providing a hash value to the TPM, with which the TPM is to extend one or more PCR values, a message, such as a protocol-specific message, can be hashed, and a header can be appended to the hash. The resulting header and hash combination can then be subsequently hashed and this subsequent hash can be provided to the TPM. The header can be an identification that the associated hash is a hash of a message. A similar mechanism can then be utilized for measured components that were initialized or executed on the computing device. Specifically, rather than providing the measurement hash of such a component directly to the TPM, the hash can first be appended to a header that can identify the hash as a hash of a component, as opposed to a message, and the header and hash combination can be subsequently hashed and this subsequent hash can then be provided to the TPM.

In a further embodiment, to enable a remote recipient to independently verify that the hash value in a log is a message, and not a malicious or untrusted component, the message itself can be provided to a remote recipient. The remote recipient can then hash the message itself and can, thereby, independently confirm that the message's hash is in the log of components that were initialized or executed on the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the utilization of an existing Trusted Platform Module (TPM) to sign messages, such as, for example, messages that are specific to a protocol that can utilize TPM functionality, including attestation and sealing functionality. Hashes of the messages to be signed by the TPM can be provided to the TPM and the TPM can extend one or more Platform Configuration Registers (PCRs) with the provided hash values in a manner analogous to the way that such a TPM would already extend PCR values with hashes of measured components that are installed or executed on the computing device that comprises the TPM. When the PCR values are subsequently signed by the TPM, as would, for example, currently be done in remote attestation and remote sealing operations, the signed PCR values can include the message hashes, thereby, indirectly, providing for TPM-signed messages. To enable the recipient of the signed PCR values to identify which hashes correspond to messages, as opposed to, for example, unknown or even malicious code, the messages themselves can be provided, thereby enabling the recipient to independently hash those messages and identify their hashes in, for example, a log file comprising the hashes that were provided to the TPM and used to derive the values of the PCRs that were signed by the TPM.

The techniques described herein focus on the communications between two computing devices that are described and illustrated as being physically separate. However, the teachings below are equally applicable to communications between any two entities that do not share an inherent trust relationship, including entities that are wholly contained within a single physical device, or entities that are amorphously supported by multiple devices. Consequently, the descriptions below are not meant to limit the enumerated embodiments to the specific inter-device communicational illustrations.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

Figure 1:
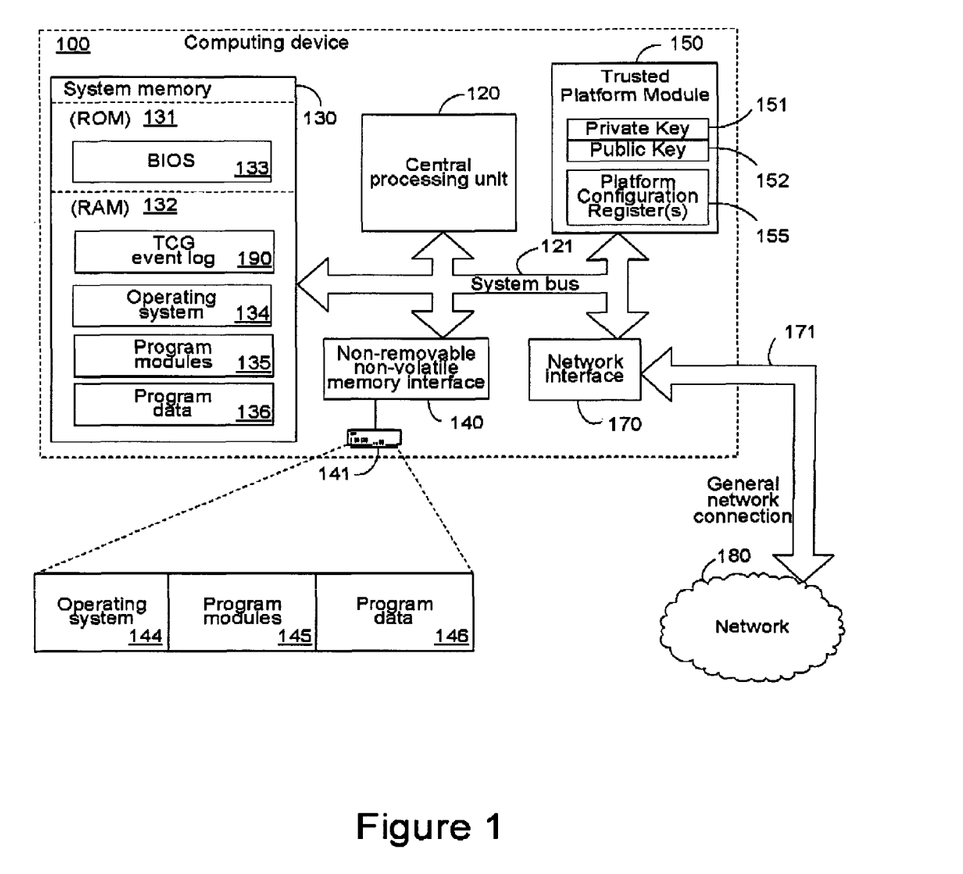
FIG. 1 is a diagram of an exemplary computing device comprising elements for utilizing a TPM to sign messages.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise encryption keys for the encryption and decryption of information provided to it and it can further store values such that they are protected by the hardware design of the TPM 150 itself. Traditionally, the TPM 150 comprises an initial set of immutable public and private encryption keys that can be utilized, in a known and established manner, to obtain disposable public and private encryption keys. The private key 151 and the public key 152 illustrated in FIG. 1 as being stored within the TPM 150 can include any such set of private and public keys, and are not meant to refer to any specific encryption key set. In addition, the TPM 150 can comprise Platform Configuration Registers (PCRs) that can securely store data provided to the TPM 150 by the CPU 120 via the system bus 121. In some embodiments, only specific code executed by the CPU 120 would be permitted to send data to the TPM 150 that would modify the values stored in the PCRs. For simplicity of illustration, the TPM 150 shown in FIG. 1 comprises a single PCR 155 meant to represent any combination of one or more PCRs.

In addition to the elements described above, the computing device 100 also typically includes computer readable media, which can include any available media that can be accessed by computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100 and the CRTM, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136 as being resident in the RAM 132. The RAM 132 can also comprise data that can be relevant to the operation of the TPM 150, such as the TCG event log 190. In one embodiment, the TCG event log 190 can comprise a unique identification of all of the modules loaded or executed by the computing device 100 since power was applied or since it was last restarted; the same modules whose loading or execution can have resulted in the values currently maintained by the TPM 150 in one or more PCRs.

The computing device 100 may additionally include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies.

Figure 2:
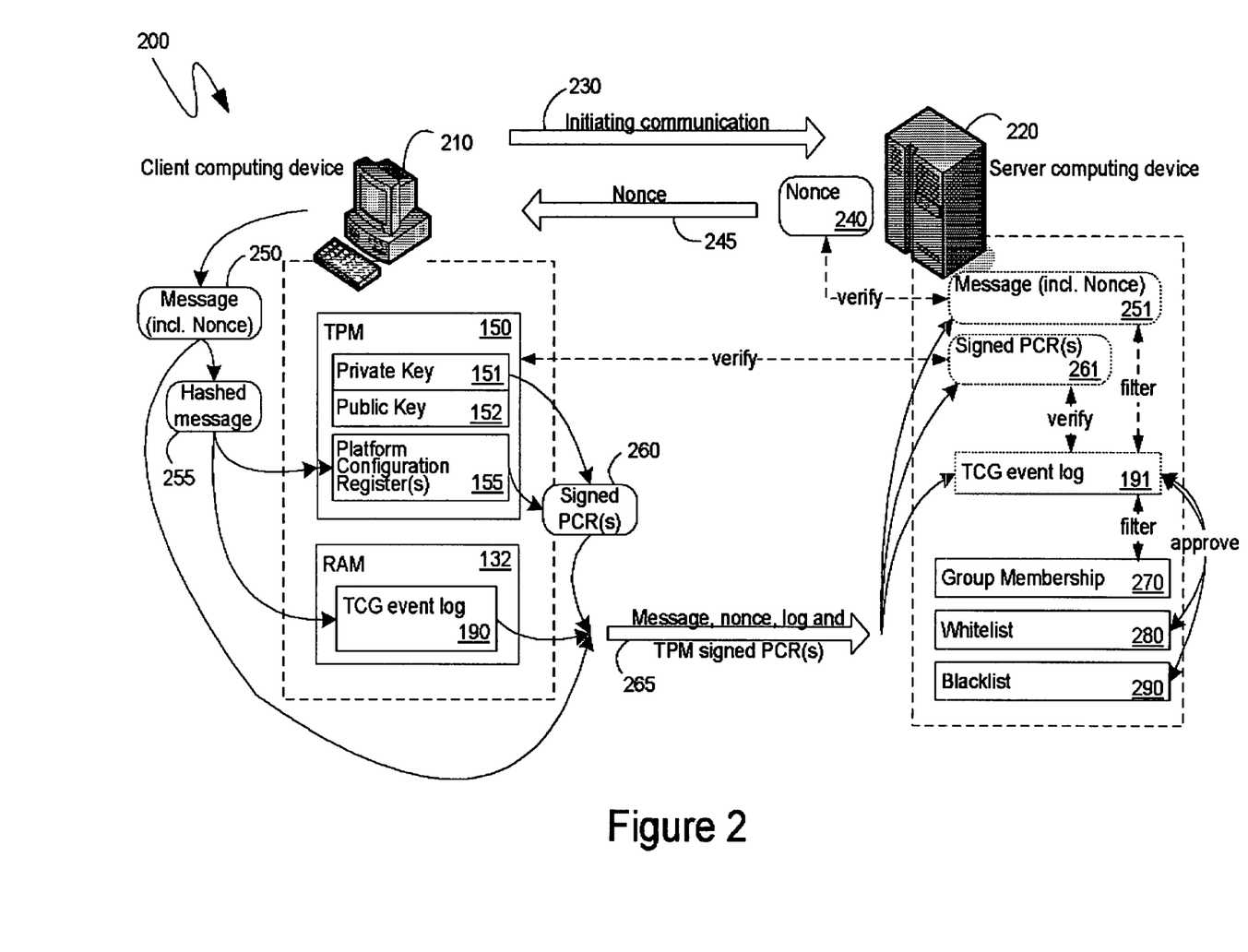
FIG. 2 is a block diagram of an exemplary communicational system utilizing TPM-signed messages.

The operation of relevant ones of the various components illustrated in FIG. 1, according to one embodiment, is described with reference to, in part, FIG. 2, which illustrates a system 200 comprising computing devices 210 and 220. Each of the computing devices 210 and 220 of FIG. 2 can be of the form of the generalized computing device 100 illustrated in FIG. 1 and described above. Consequently, for reference and notational convenience, elements of the computing device 100 relevant to the operations and communications illustrated in FIG. 2 are shown as part of the computing devices 210 and 220 with the same reference numerals as were utilized for that same element in FIG. 1. Thus, for example, the client computing device 210 is illustrated in FIG. 2 as comprising a TPM 150 with a private key 151, a public key 152 and one or more PCRs 155, and the client computing device is also illustrated as comprising RAM 132 with the TCG event log 190, with each of the TPM, the private and public keys, the PCRs, the RAM and the TCG event log being as described above and as illustrated in FIG. 1.

The communications of FIG. 2 are illustrated within the context of the physically separate computing devices 210 and 220. However, as indicated previously, the descriptions below of such communications are equally applicable to communications between any two computing entities and can include communications between, for example, virtual machines executing on a single computing device or communications between computing constructs executing across multiple computing devices. Similarly, while the computing devices 210 and 220 are nominated as a "client" device and a "server" device, such nominations are strictly for ease of description and are not intended to convey any inherent limitations of the communications and mechanisms described.

Within the context of the system 200, the client computing device 210 can be in communication with the server computing device 220 such that the communication comprises a remote attestation or a remote sealing operation. For example, the client computing device 210 can be seeking to join a network protected by the server computing device 220, whereby the server computing device can request that the client computing device remotely attest to its state before being allowed to join the network. The initiating communication 230 is, therefore, intended to reference that communication which can initiate the relevant remote attestation or remote sealing operation, and is not necessarily the very first communication between the client computing device 210 and the server computing device 220.

In response to the initiating communication 230, the server computing device 220 can generate a nonce 240 and can provide that nonce to the client computing device 210 via communication 245. The nonce 240 can be, as will be known by those skilled in the art, any collection of information that can enable the server computing device 220 to guard against "replay attacks" or any similar mechanism by which a device attempts to present another device's response as its own. To enable such a determination, the client computing device 210, as will be described below, can include the nonce 240 in a subsequent reply message.

Upon receiving the nonce 240 via communication 245, the client computing device can generate a message 250 that is intended for the server computing device 220. To enable such a message to be signed by the TPM 150, the client computing device 210 can hash the message, thereby generating a hashed message value 255. The hashed message 255 can be provided to the TPM 150 and the TPM can extend one or more PCRs 155 with that value, much as the TPM would extend one or more PCRs with the hashed value of a component installed or executed on the client computing device 210 as part of its traditional operation. The hashed message 255 can also be added to the TCG event log 190 to maintain the parity between the entries in the log and the values of the PCRs 155.

The message 250 generated by the client computing device 210 can be any type of information relevant to the purpose for which the client computing device and the server computing device 220 are communicating. For example, in one embodiment, the message 250 can be nothing more than an indication to the server computing device 220 that the nonce 240 is provided in that message. In another embodiment, the message 250 can comprise additional information, such as would be expected by the server computing device 220 in accordance with the protocol being utilized by the client computing device 210 and the server computing device. Again, to prevent what are known as "replay" attacks, such protocol messages can traditionally include the nonce 240.

Once the client computing device 210 has provided the hashed message 255 to the TPM 150 and the PCRs 155 have been extended, and once the TCG event log 190 has been updated with the hashed message, the client computing device can generate a response communication 265 to the server computing device 220. In generating the response communication 265, the client computing device 210 can request that the TPM 150 sign one or more of the PCR 155 values with, for example, one of the private keys 151 maintained by the TPM, thereby generating a signed version of those PCR values 260. The signed version of the PCRs 260 can be included in the response communication 265, together with the TCG event log 190. To enable the receiver, such as the server computing device 220 in this example, to be able to meaningfully evaluate the log, such in the manner described further below, the client computing device 210 can also include, in the response communication 265, a copy of the message 250, which would include the nonce 240.

Upon receiving the response communication 265, the server computing device 220 can perform a number of verifications and decisions, as indicated by FIG. 2. For ease of reference, the copy of the message 250 that is received by the server computing device 220 is numbered 251, the copy of the signed PCRs 260 received by the server computing device are numbered 261 and the copy of the TCG event log 190 received by the server computing device is numbered 191. As shown, the server computing device 220 can compare the nonce that was received, which can be part of the message that was received 251 to the nonce 240 that was originally transmitted by the server computing device via communication 245. If they do not match, the server computing device 220 can, in one embodiment, determine that the response communication 265 may be part of a replay attack and can select to not engage in further communication with the client computing device 210.

In addition to comparing the received nonce, as part of the received message 251, to the nonce 240, the server computing device 220 can also extract the received signed PCRs 261 and can, based on the signature, verify that they were signed by the TPM 150. In one embodiment, as will be known by those skilled in the art, the private key 151 used to generate the signed PCRs 260 can be unique to the TPM 150. Consequently, based on the public key 152 that it used, the server 220 can verify that the signed PCRs 261 it received were, in fact, signed by the TPM 150.

The server computing device 220 can also utilize the signed PCRs 261 it received to verify the TCG event log 191 it received. Specifically, the server computing device 220 can utilize the hashes contained within the log 191 to independently, step-by-step, extend one or more PCR values as the TPM 150 would have on the client computing device 210 as the components referenced by the log 190 would have been installed or executed on the client computing device. If, in doing so, the server computing device 220 derives the same PCR values as the PCRs 261 it received, it can have successfully verified that the received log 191 accurately reflects what was actually installed or executed on the client computing device 210 based on this parity with the received PCR values. Because tampering with the signed PCR values 260 can be detected, if the received TCG event log 191 results in different PCR values than those of the received signed PCRs 261, the server computing device 220 can conclude that the received TCG event log 191 does not accurately reflect the components that have been loaded or executed on the client computing device 210. Consequently, the server computing device 220 can determine that, since the state of the client computing device 210 cannot be accurately ascertained, it cannot be trusted.

If the received TCG event log 191 is verified by reference to the received signed PCRs 216, the server computing device 220 can proceed to evaluate the log to determine, for example, whether to trust the client computing device 210 or whether to unseal some data and provide it to the client computing device. As described above, a generalized attestation or sealing process can be utilized, whereby the server computing device 220 can collapse the received TCG event log 191 by reference to a group membership 270, replacing each of the hashes, in the received log, of components of a group, as identified by the group membership, with a common name or other identifier of the group itself. In such a manner, the server computing device 220 can collapse the TCG event log 191 from a long listing of hashes to a shorter listing of larger groups, where, as indicated previously, the exact order in which various components of those groups were loaded or executed, becomes irrelevant.

Once so collapsed, the received TCG event log 191 can be evaluated by the server computing device 220 based on a whitelist 280, a blacklist 290, or some combination thereof. For example, in one embodiment, the server computing device 220 can determine to positively respond to the client computing device 210 if all of the groups listed in the collapsed received TCG event log 191, and all of the components whose hashes were not replaced by a group name, are listed in the whitelist 280. In an alternative embodiment, the server computing device 220 can determine to positively respond to the client computing device if merely there is nothing within the collapsed received TCG event log 191 that is identified on the blacklist 290.

In performing the evaluations of the received TCG event log 191, the server computing device 220 can utilize the received message 251 to identify those hashes, listed in the received log, that are due to the message hash 255. Specifically, as the server computing device 220 undertakes the process of collapsing the received TCG event log 191 with reference to the group membership 270, the message hash 255 will be left in the log, since it is, obviously, not part of any group listed in the group membership 270. Of course, the server computing device 220 cannot know that this hash is the hash of a message, since such a hash could equally be that of a malicious or untrusted component. To enable the server computing device 220 to determine that the hash actually is the hash of the message 250, the client computing device 210 can include the message in the response communication 265. The server computing device 220 can then, independently, hash the received message 251 and verify that the hash it obtained is the same as the one listed in the received TCG event log 191. In one embodiment, upon independently hashing the received message 251, the server computing device 220 can remove that hash from the received TCG event log 191, since it has, independently, verified that the hash does not represent an unknown, and possibly malicious component.

As can be seen, by including the hash 255 of the message 250 into the PCRs 155 and the TCG event log 190, the client computing device 210 can cause such a message to be signed by the TPM 150, as part of the process of generating the signed PCRs 260. A recipient, such as the server computing device 220, can then, by also receiving the message 250 itself, verify its hash in the received TCG event log 191, verify that the received log accurately matches with the received signed PCRs 261, and can verify that the received signed PCRs were, in fact, signed by the TPM 150. The recipient, therefore, can receive both the message 250 and an indication, via the signed PCRs 260, that the TPM 150 signed the message.

Figure 3:
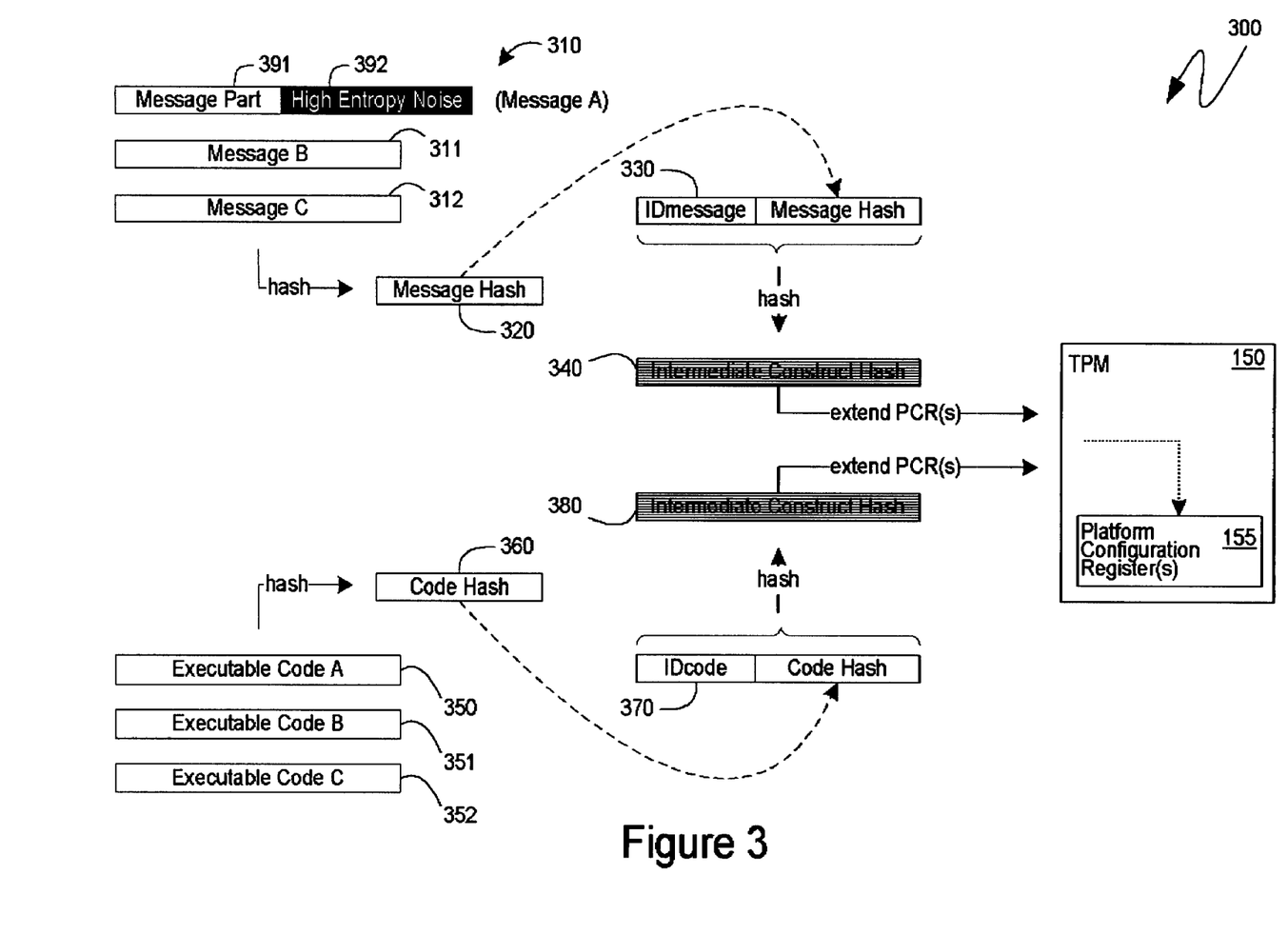
FIG. 3 is a block diagram of an exemplary PCR extension mechanism.

The received message 251, however, may reveal, to the server computing device 220, information that the client computing device 210 did not intend. For example, if the client computing device 210 had previously communicated with another server computing device, its TCG event log 190 could comprise, not only the hashed message 255, but also hashes of messages previously sent to that other computing device. In such a case, the communication 265 could include, for the reasons indicated above, a copy of each of those messages. In such a case, the server computing device 220 could end up receiving copies of messages that were previously transmitted, and which may have been secret and not intended to be revealed to other computing devices, including, for example, the server computing device 220. In another embodiment, therefore, an additional hash is performed to prevent the transmission of a message, such as message 250, directly, thereby alleviating the risk that secret messages will be sent to computing devices other than the intended computing device. Turning to FIG. 3, a system 300 is illustrated showing such an other embodiment with the additional hashing step. As illustrated by system 300, rather than extending PCRs 155 with a hash of a message, such as message C 312, the PCRs can be extended with a hash 340 of an intermediate construct comprising a message hash 320 and a header 330. Subsequently, rather than providing message C 312 to a recipient, in order to verify which hash can be safely excluded from the received TCG event log 191, the intermediate construct comprising the message hash 320 and the header 330 can be provided. Such an intermediate construct, since it comprises only a hash value and a header, and not the message itself, can, thereby, reduce the above described security risk.

More specifically, the system 300 of FIG. 3 is shown comprising a series of messages, in the form of message A 310, message B 311 and message C 312 which can be intended to be signed by the TPM 150 in the above described manner. Thus, message A 310, message B 311 and message C 312 can be hashed and provided to the TPM 150 with a request that the TPM extend one or more PCRs 155 with the provided hash values. Similarly, the system 300 can also comprise a series of components, in the form of executable code A 350, executable code B 351, and executable code C 352 which can, similarly, be hashed and provided to the TPM 150 with a request that the TPM extend one or more PCRs 155 with the provided hash values. As will be recognized by those skilled in the art, this hashing of components and extension of PCRs 155 with the resulting values can be part of the traditional operation of a TPM 150 and associated computing system.

However, as illustrated in FIG. 3, in one embodiment, rather than providing a hash, such as the message hash 320 or the code hash 360, directly to the TPM 150, an intermediate construct can be generated and a hash 340 or 380 of that intermediate construct can, instead, be provided to the TPM. Thus, as shown, message hash 320, which can, as an example, be a hash of any of the messages 310, 311 or 312 shown, can have appended to it a header 330 that can be an identifier that the following hash value is a hash value of a message, as opposed to, for example, an executable code segment or other component. In one embodiment, the header 330 can be nothing more than a predetermined unique identifying value that identifies the hash 320 appended to it as the hash of a message.

To maintain parity, another embodiment contemplates that a similar process can be utilized for components, such as executable code segments 350, 351 and 352 of system 300. Thus, while in one embodiment, the intermediate construct described above can only be utilized for messages, such as messages 310, 311 and 312, in the now described other embodiment, existing mechanisms for measuring components, such as the executable code segments 350, 351 and 352, can be modified to similarly utilize an intermediate construct. Specifically, instead of providing, to the TPM 150, a code hash 360, which can, for example, be a hash of any of the executable code segments 350, 351 and 352, the TPM can instead be provided with the hash 380 of an intermediate construct comprising the code hash 360 and a header 370 appended to it, identifying the following hash as being a hash of a component, as opposed to, for example, a message. As before, in one embodiment, the header 370 can be nothing more than a predetermined unique identifying value that identifies the hash 360 appended to it as the hash of a component.

The intermediate constructs comprising the message hash 320 and a header 330, or comprising the code hash 360 and a header 370 can then be, themselves, hashed, resulting in the intermediate construct hash 340 and the intermediate construct hash 380, respectively, before being provided to the TPM 150. The TPM 150, therefore, can extend one or more PCRs 155 with the hash values 340 and 380 of the intermediate constructs, as opposed to the hashes 320 or 360 themselves. Within the context of the communications of system 200, as described in detail above, the response communication 265 would, now, not need to include the message 250 itself and could, instead, include the intermediate construct comprising a message hash 320 and a header 330. Due to the nature of hashing, the contents of a message, such as, for example, message C 312, can be difficult to obtain from only a message hash 320. Consequently, since the message hash 320, as part of the intermediate construct, can be the only aspect of a message, such as, for example, message C 312, that is received by the server computing device 220, the contents of the message itself can remain secret.

As will be known by those skilled in the art, however, in certain instances, content can be reverse-engineered from its hash. Specifically, if, for example, a message, such as message C 312, does not comprise a sufficient amount of information, or comprises an ordered type of information, its hash, such as, for example, the message hash 320, can enable a computing device to obtain the content of message C 312 from the hash 320. For example, a computing device could generate possible messages and hash them and then compare the hashes to, for example, message hash 320, in order to find which message results in the same hash and, thereby, identify the content of the message C 312. To guard against such mechanisms, and maintain the secrecy of previously sent messages within the above described implementations, another embodiment contemplates the addition of high entropy data, or other similar "noise" to a message prior to the hashing of that message. Thus, for example, as illustrated in the system 300 of FIG. 3, the message A 310 can comprise a message part 391 and a high entropy noise part 392. The resulting message hash 320 of message A 310 can be sufficient to protect the information in the message part 391 of message A. Consequently, the provision of the intermediate construct, comprising the identifier 330 and the message hash 320, to the server computing device 220 can, nevertheless, maintain the secrecy of the message part 391 of message A 310, since the server computing device would not be capable of deriving the information contained within the message part 391 from only the message hash 320 it received.

Figure 4:
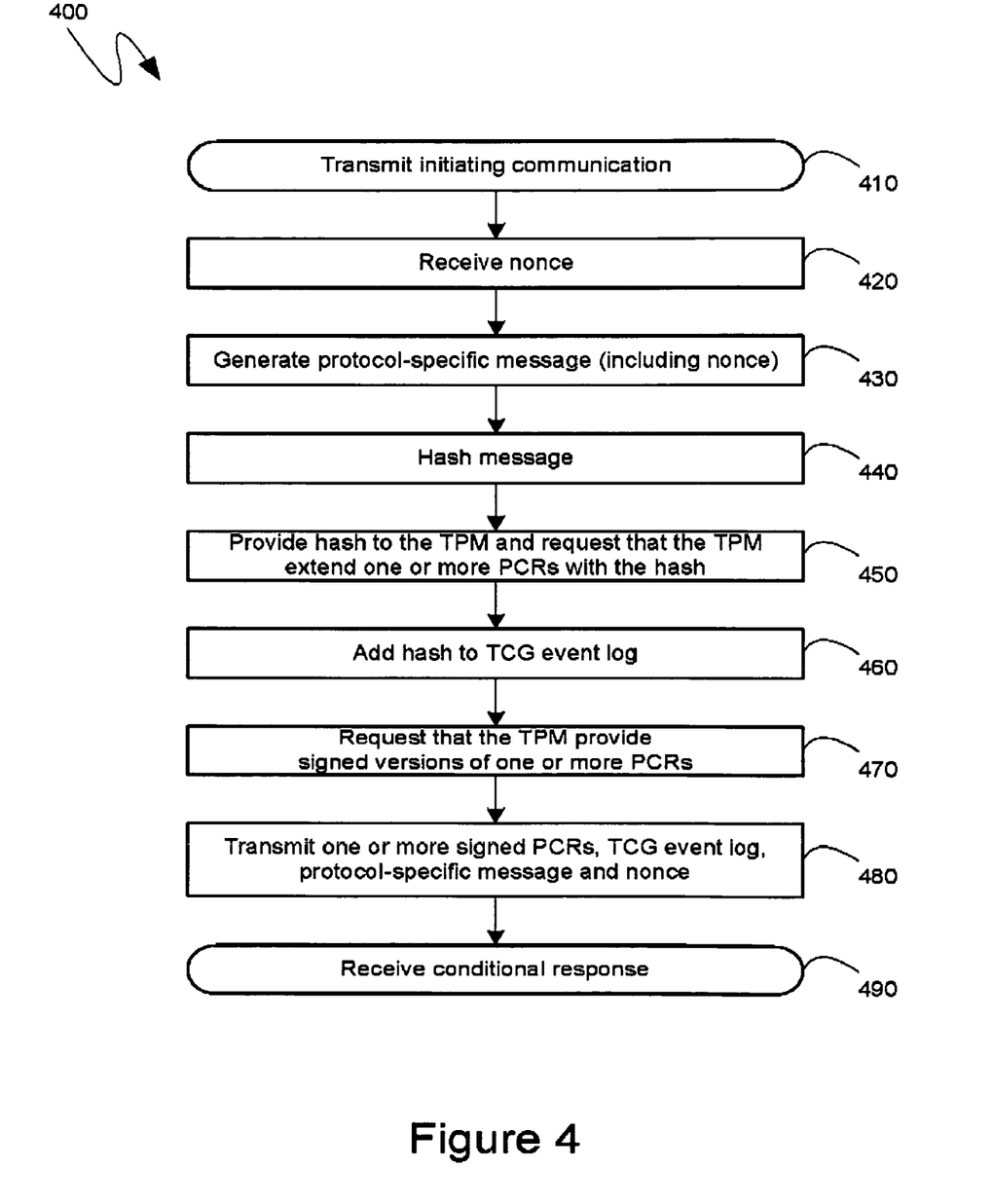
FIG. 4 is a flow diagram of an exemplary TPM message signing.
Figure 5:
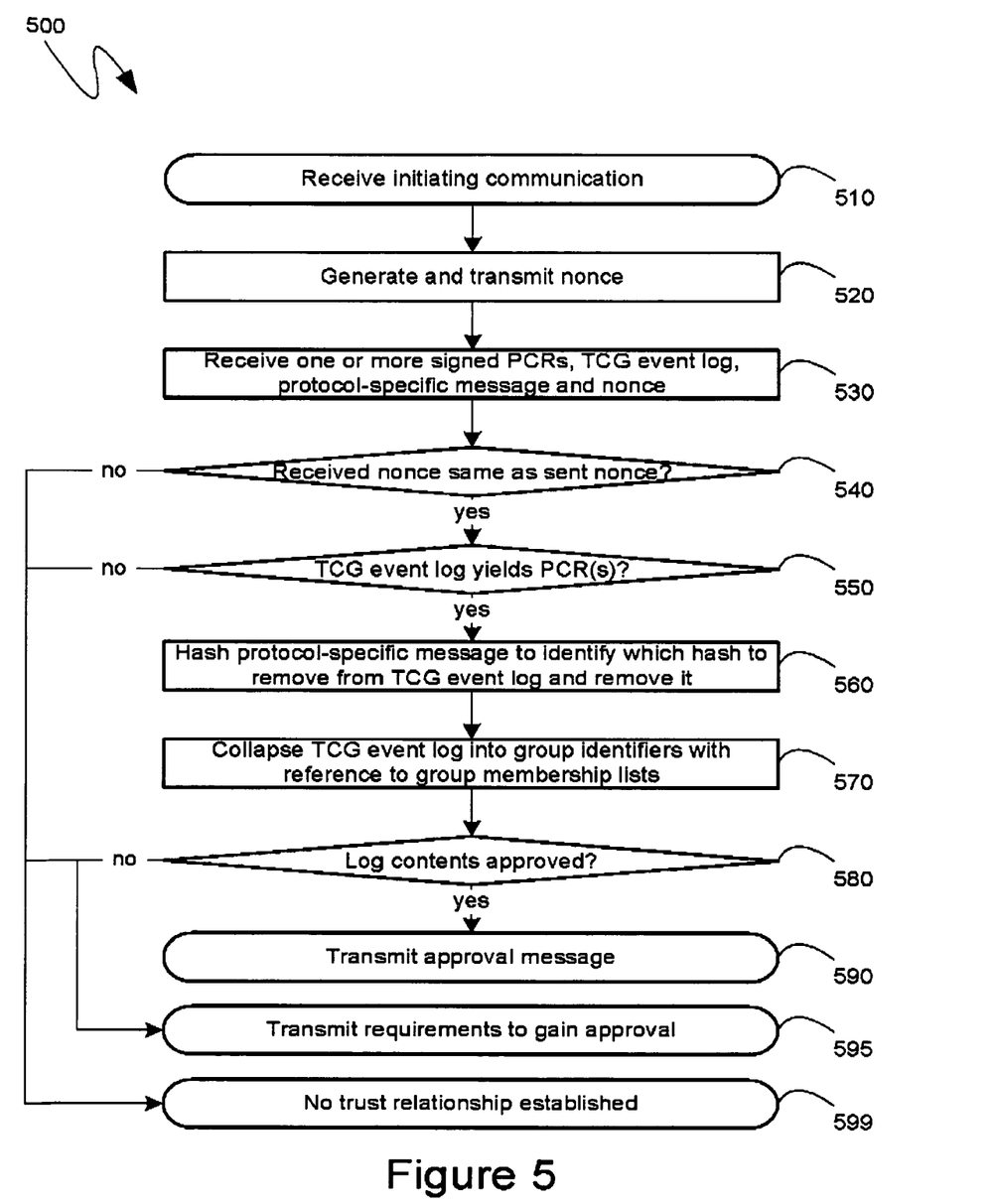
FIG. 5 is a flow diagram of an exemplary utilization of TPM-signed messages.

Turning to FIGS. 4 and 5, flow diagrams 400 and 500 illustrate the operations of a sending and a receiving computing device, respectively, according to one embodiment. Beginning with the flow diagram 400 of FIG. 4, the relevant actions can be initiated by transmitting an initiating communication at step 410. As indicated previously, such an initiating communication can be any communication that can cause the utilization of mechanisms that comprise remote attestation, remote sealing, or another similar mechanism that can benefit from TPM-signed messages. In response to the initiating communication of step 410, a nonce can be sent that can be received at step 420.

Once the nonce has been received at step 420, a message can be generated at step 430. As indicated in flow diagram 400, such a message can be in accordance with the protocol established between the sending and receiving entities. In one embodiment, as indicated previously, the message generated at step 430 can be nothing more than an indication that the nonce, received at step 420, is included. In another embodiment, as also indicated previously, the message generated at step 430 can comprise whatever information is called for by the particular protocol being utilized.

After the message has been generated at step 430, it can be hashed at step 440 and the message hash can be provided, at step 450, to the TPM with a request that the TPM extend one or more PCR values with the hash. Additionally, at step 460, the hash of the message can be added to the TCG event log. As will be recognized by those skilled in the art, step 460 can also occur in parallel with step 450, or even before it, since steps 450 and 460 are not dependent upon one another.

At some time after the extension of the PCRs with the message hash at step 450 and the adding of the message hash to the log at step 460, the sending entity can request, at step 470, that the TPM provide signed versions of one or more PCRs for transmission to a receiving entity. As will be known by those skilled in the art, PCRs traditionally are maintained and accessible only by the TPM. Consequently, the TPM can provide, as a result of the request of step 470, one or more sets of data representing the signed PCR values. The sending entity can then, at step 480, compose, and transmit, a response communication that comprises the data obtained from the TPM, the TCG event log, the nonce received at step 420 and, for the reasons indicated above, a copy of the message or messages generated at step 430.

After the response communication of step 480 is sent, some form of a conditional response may be received at step 490. Such a conditional response can be, in the manner described above, and further described below, conditioned on the information provided at step 480. For example, the conditional response of step 490 may be an indication that the computing device will be allowed to join a network, or will be allowed to receive a specific set of data. The precise nature of the conditional response, however, is orthogonal to the mechanisms described herein.

Turning to the flow diagram 500 of FIG. 5, illustrating an exemplary series of steps that can be performed by a receiving entity, the initiating communication sent at step 410, and described above, can be received at step 510. Subsequently, in response to the receipt of such a communication at step 510, the receiving entity can, at step 420, generate a nonce and return it to the sending entity. Ultimately, if steps 420 through 480 are performed properly, a response communication can be received at step 530. As indicated, the response communication received at step 530 can comprise the signed PCR values, the TCG event log, the nonce and copies of the message or messages that were sent at step 480.

Once the response is received at step 530, an series of evaluations can be made, as shown by steps 540 and 550. Although step 550 is illustrated as being conditional on step 540, such illustration is strictly for simplicity, as step 550 is orthogonal to step 540 and, consequently, could be performed prior to step 540 or in parallel therewith. The evaluation, at step 540, as shown, checks the nonce received at step 530 with the nonce that was sent at step 520. If the two nonces differ, then the communication that was received at step 530 may be part of a replay attack. Consequently, as shown, if it is determined, at step 540, that the nonces are not the same, a determination can be made, at step 599, that a trust relationship cannot be established and processing relevant to the mechanisms described herein can stop.

However, if the nonces are the same, another evaluation, at step 550, can verify that the TCG event log that was received at step 530 yields, when the PCR extension process is independently performed, as described in detail above, the same PCR values as those that were signed and also received at step 530. If the same values are not independently obtained, then, again, at step 599, a determination can be made that a trust relationship cannot be established, since the receiving device cannot accurately evaluate what has been loaded or executed on the sending device. If the same PCR values are independently obtained at step 550, then at step 560, an evaluation of the TCG event log can commence.

Although not specifically illustrated in flow diagram 500, another verification can be performed together with those illustrated at steps 540 and 550. Specifically, the signed PCRs can uniquely identify a particular TPM based on the public and private key pair utilized since, as will be known to those skilled in the art, a variety of public and private key pairs can be uniquely associated with a single, particular TPM. As with the decisions at step 540 and 550, the verification of which, specific, TPM signed the PCR values received at step 530 can either result in continued processing, such as with step 560, or in a determination, at step 599, that a trust relationship cannot be established.

Returning to step 560, for one part of the evaluation of the TCG event log, the message or messages received at step 530 can be hashed and the equivalent hashes can be accounted for in the received TCG event log. In one embodiment, such an accounting can comprise removing the relevant hashes from the received TCG event log. Subsequently, at step 570, the TCG event log can be collapsed into group identifiers via reference to group membership lists, such as in the manner described in detail above. The simplified contents of the TCG event log, with much of the loading variability eliminated, again, as described above with reference to the generalized attestation and generalized sealing processes, a determination can be made, at step 580, as to whether the contents of the collapsed log suggest that the entity from which the log was sent can be trusted, or otherwise approved for whatever purpose the evaluation was being performed.

If, at step 580, it is determined that the entity from which the TCG event log was sent is in an approvable state, an appropriate approval message can be sent at step 590. For example, such an approval message can comprise information needed to join a protected network, data that was previously sealed, or any other information that can have been contingent on an approval process, such as that described. However, if, at step 580, a determination is made, based on the received TCG event log, that the entity that sent the log is not approved, then the relevant processing can, again, end with a failure to establish an appropriate trust relationship at step 599. In an alternative embodiment, a response can be transmitted, at step 595, that can inform the other entity of steps that it can perform, or requirements that it can meet, in order to gain approval. For example, if the evaluation of the log contents at step 580 revealed that outdated security software was installed on the entity that generated the log, the requirements, as transmitted at step 595, could indicate that the installation of updated security software would result in approval. Such a response could, after the prescribed remedial action was taken, result in another round of communications analogous to those described above As can be seen from the above descriptions, mechanisms for causing messages to be signed by existing TPM hardware and support structures have been presented. In view of the many possible variations of the subject matter described herein, we claim as our invention all such embodiments as may come within the scope of the following claims and equivalents thereto.

We claim:

1. A computer-readable storage device having computer-executable instructions for signing messages with a trusted platform module, the computer-executable instructions performing steps comprising:

receiving a nonce from a second computing device with which a first computing device, on which the computer-executable instructions are executing, is communicating;

generating, in response to the receiving the nonce, a message for transmission to the second computing device, the message comprising the nonce and additional information expected by the second computing device in accordance with a protocol being utilized between the first computing device and the second computing device;

hashing the message at least once;

providing a hash associated with the message to the trusted platform module;

requesting the trusted platform module to extend at least one platform configuration register, securely maintained by the trusted platform module, with the hash associated with the message;

adding the hash associated with the message to an event log;

requesting the trusted platform module to sign the at least one platform configuration register; and transmitting, to the second computing device, in response to the receiving the nonce, the message generated in response to receiving the nonce, together with the event log and the signed at least one platform configuration register.

2. The computer-readable storage device of claim 1, having further computer-executable instructions performing steps comprising: appending a header to the hash of the message to generate an intermediate construct; and hashing the intermediate construct, wherein the hash associated with the message is the hash of the intermediate construct.

3. The computer-readable storage device of claim 2, having further computer-executable instructions performing steps comprising: appending a high entropy part to the message prior to the hashing the message at least once.

4. A computer-readable storage device, having computer-executable instructions for verifying messages signed by a trusted platform module, the computer-executable instructions performing steps comprising:

transmitting a nonce from a first computing device on which the computer-executable instructions are executing to a second computing device, comprising the trusted platform module, with which the first computing device is communicating;

receiving, in response to the transmitting the nonce, at least one message comprising the nonce and additional information expected by the first computing device in accordance with a protocol being utilized between the first computing device and the second computing device, an event log comprising a hash associated with the at least one message, and at least one trusted platform module signed platform configuration register, the at least one trusted platform module signed platform configuration register having been extended with the hash associated with the at least one message;

comparing the transmitted nonce to the nonce from the received at least one message;

independently generating the hash associated with the at least one message; and evaluating the event log with reference to the independently generated hash associated with the at least one message.

5. The computer-readable storage device of claim 4, wherein the received at least one message further comprises an intermediate construct comprising a header and a message hash, and wherein further the hash associated with the at least one message comprises an intermediate construct hash of the intermediate construct.

6. The computer-readable storage device of claim 5, wherein the header comprises a pre-determined identifier indicating that the header is appended to hashed message-type data.

7. The computer-readable storage device of claim 4, having further computer-executable instructions performing steps comprising verifying a sending entity of the at least one message, the event log, and the at least one trusted platform module signed platform configuration register by reference to a key associated with the at least one trusted platform module signed platform configuration register.

8. The computer-readable storage device of claim 4, wherein the computer-executable instructions for evaluating the event log with reference to the independently generated hash associated with the at least one message comprise computer-executable instructions for removing the independently generated hash associated with the at least one message from the event log.

9. The computer-readable storage device of claim 4, having further computer-executable instructions performing steps comprising: collapsing the event log by reference to at least one group membership list comprising hashes of components of a group associated with the group membership list.

10. The computer-readable storage device of claim 4, having further computer-executable instructions performing steps comprising: evaluating the event log with reference to a whitelist of known good elements.

11. The computer-readable storage device of claim 4, having further computer-executable instructions performing steps comprising: evaluating the event log with reference to a blacklist of known malicious elements.

12. A method of signing messages, sent to a second computing device, with a trusted platform module of a first computing device from which the messages are sent, the method comprising the steps of:

receiving a nonce from the second computing device;

generating, in response to the receiving the nonce, a message for transmission to the second computing device, the message comprising the nonce and additional information expected by the second computing device in accordance with a protocol being utilized between the first computing device and the second computing device;

hashing the message at least once;

providing a hash associated with the message to the trusted platform module;

requesting the trusted platform module to extend at least one platform configuration register, securely maintained by the trusted platform module, with the hash associated with the message;

adding the hash associated with the message to an event log;

requesting the trusted platform module to sign the at least one platform configuration register; and transmitting, to the second computing device, in response to the receiving the nonce, the message generated in response to receiving the nonce, together with the event log and the signed at least one platform configuration register.

13. The method of claim 12, further comprising the steps of: appending a header to the hash of the message to generate an intermediate construct; and hashing the intermediate construct, wherein the hash associated with the message is the hash of the intermediate construct.

14. The method of claim 13, further comprising the steps of: appending a high entropy part to the message prior to the hashing the message at least once.

15. The method of claim 12, further comprising the steps of: receiving at least one message, a received event log comprising a hash associated with the at least one message, and at least one trusted platform module signed platform configuration register, the at least one trusted platform module signed platform configuration register having been extended with the hash associated with the at least one message; independently generating the hash associated with the at least one message; and evaluating the received event log with reference to the independently generated hash associated with the at least one message.

16. The method of claim 14, further comprising the steps of: transmitting, prior to the receiving the at least one message, a nonce; and comparing the transmitted nonce to a received nonce, the at least one message comprising the received nonce.

* * * * *